United States Patent [19]

Radovan et al.

[11] Patent Number: 4,942,897

[45] Date of Patent: Jul. 24, 1990

[54] REMOTE CONTROL AND REMOTE HANDLING ACCESSORY, ESPECIALLY FOR THE HOT ZONE OF RADIOACTIVE PLANTS

[75] Inventors: Giuseppe Radovan, Lindau; Klaus Blaseck, Ehlershausen; Lothar Hoffmeister, Hanover; Helmut Westendorf, Haste, all of Fed. Rep. of Germany; Michael J. Sandling, Prixfor; James W. Davidson, Prixford, both of Great Britain

[73] Assignees: Xomox Limited, Devon, Great Britain, United Kingdom; Deutsche Gesellschaft Fur Wiederaufarbeitung Von Kernbrennstoffen MBH, Hanover, Fed. Rep. of Germany

[21] Appl. No.: 872,194

[22] Filed: Jun. 9, 1986

[30] Foreign Application Priority Data

Jun. 7, 1985 [DE] Fed. Rep. of Germany ....... 3520541

[51] Int. Cl.[5] .............................................. F16K 27/00

[52] U.S. Cl. .................................. 137/454.2; 251/312

[58] Field of Search ....................... 137/454.2; 251/312

[56] References Cited

U.S. PATENT DOCUMENTS 4,571,820 2/1986 Matsumoto et al. .

4,606,368 8/1986 McCafferty ...................... 137/454.2

FOREIGN PATENT DOCUMENTS 0013526 7/1980 European Pat. Off. .

0133755 3/1985 European Pat. Off. .

2615220 10/1977 Fed. Rep. of Germany .

3406158 8/1985 Fed. Rep. of Germany .

1072393 6/1967 United Kingdom .

1561159 2/1980 United Kingdom .

2073376 10/1981 United Kingdom .

2143929 2/1985 United Kingdom .

*Primary Examiner*—Gerald A. Michalsky

*Attorney, Agent, or Firm*—Helfgott & Karas

[57] ABSTRACT

The remote control and remote handling accessory is of such design that an exchange part (7) contains all elements subject to wear of the accessory, while the anti-wear elements, in particular the accessory case (2) remain firmly connected to the pipeline (1). The exchange part (7) and the accessory case (2) are mutually fixed by a clamping bracket (9). The exchange part (7) comprises a central bolt (16) which is displaceable with respect to the other components of the exchange part (7) and is supported in both axial directions by the clamping bracket (9) which is adapted to be swung open. In this manner the exchange part can be pressed into and pulled out of the anti-wear part (accessory case 2). The other components of the exchange part (7) are connected to a cover (15) with respect to which the central bolt (16) is rotatable, the cover (15) being secured to a slide shoe (8) of a stationary guide rail (4). The anti-wear elements of the accessory and particularly of the accessory case (2) are held firmly at the stationary guide rail (4). The clamping bracket (9) is pivotably secured to the accessory case (2).

8 Claims, 6 Drawing Sheets

REMOTE CONTROL AND REMOTE HANDLING ACCESSORY, ESPECIALLY FOR THE HOT ZONE OF RADIOACTIVE PLANTS

The instant invention relates to a remote control and remote handling accessory, especially for the hot zone of radioactive plants, and more particularly to accessories comprising a case to be fitted in a pipeline and a movable exchange part of the accessory.

Plant equipment which is loaded radioactively during processing engineering usually is made up of modules in such manner that complete modules can be exchanged, as required. Such an exchange is made by remote handling devices, such as manipulators. Also in non-radioactive areas particularly in the chemical industry it must be possible to use remote handling tools for the safe, quick, reliable, and durable servicing and repair of accessories or fittings involved in industrial processing as they are subject to wear.

In assembling accessories, such as valves in a pipeline the two pipeline sections to be connected have in the past generally each included a welded-on flange to which mating flanges of the accessory were connected by screws. This means that at least two points of separation were needed and, in the case of three screws per flange, for instance, this required actuating a total of six screws. The exchange procedure is also not limited to the defective component of the structural member but instead includes replacement also of components of structural members, such as the accessory case which still are functioning properly. In addition rather complicated manipulators are needed to loosen screws located at different places.

It is, therefore, an object of the invention to improve the aforementioned such that the accessory elements subject to wear can be exchanged quickly, safely, and reliably under remote handling conditions with limited use of tools and in a short time.

This object is met, in accordance with the invention, by providing that the exchange part contains all elements subject to wear of the accessory, and that the exchange part is adapted to be taken out of and inserted in the accessory case while the latter is connected firmly with the pipeline.

Thus only those elements of the accessory which are subject to wear are replaced, while the elements not subject to wear of the accessory remain fixed in the pipeline. Another object of the invention is to eliminate the disadvantage that the pipeline ends to be connected no longer be aligned accurately upon removal of the entire accessory and, therefore, must be realigned for reinstallation of the accessory, a circumstance requiring additional working steps to be done by the manipulator. A further object of the invention is to simplify remote handling so as to permit the replacement of the exchange part to be effected by portable remote handling means. Still further objects of the invention are to provide in accessory of compact structure; the laying of the pipeline to be rectilinear, whereas a U-shaped pipeline has heretofore been used with the known accessories in order to assure that all flange screws to be actuated remotely were directed toward one side;

More specifically in accord with the invention a clamping bracket is pivotally secured to the accessory case and the forces needed for assembly and disassembly of the exchange part in axial direction are applied by this clamping bracket.

In combination with the clamping bracket a central bolt 4 permits the entire assembly and disassembly to be made by a single bolt or screw suitable for remote handling.

The central bolt has a collar which fits within a groove on the clamping bracket.

The clearance is provided between the central bolt and the clamping bracket in axial direction which permits, on the one hand, the bracket to be swung upon and, on the other hand, the adjustment of the forces acting in axial direction when the accessory is in its operating state. The exchange part may also contain a cover threadedly engaged to the bolt as well as other elements which are axially displaced together with the cover. The cover is connected to a slide shoe on a guide rail and the remote handling tool as well may be displaced along the guide rail.

Moreover, the remote control device which usually is pivoted laterally out of the way during remote handling may be held on the guide rail and, in addition, may be connected in the operative state with respect to the accessory through lateral cams secured to the bracket.

Thus, the exchange part of the accessory according to the invention may be exchanged by remote control using movable remote handling means, while the anti-wear accessory case remains firmly welded in the pipeline structure.

With this construction the accessory or fitting according to the invention may be used wherever there is need for remote control and remote handling in order to replace parts which are subject to wear. An especially important field of application is the hot zone of radioactive plants, such as reprocessing plants. However, the invention is applicable also in chemical plants where an exchange of parts subject to wear by use of remote handling means is required for the most varied reasons (risk of poisoning, high temperatures, etc.).

The invention will be described further, by way of example, with reference to the accompanying drawings, in which.

Figures 1, 2, 3, 4:
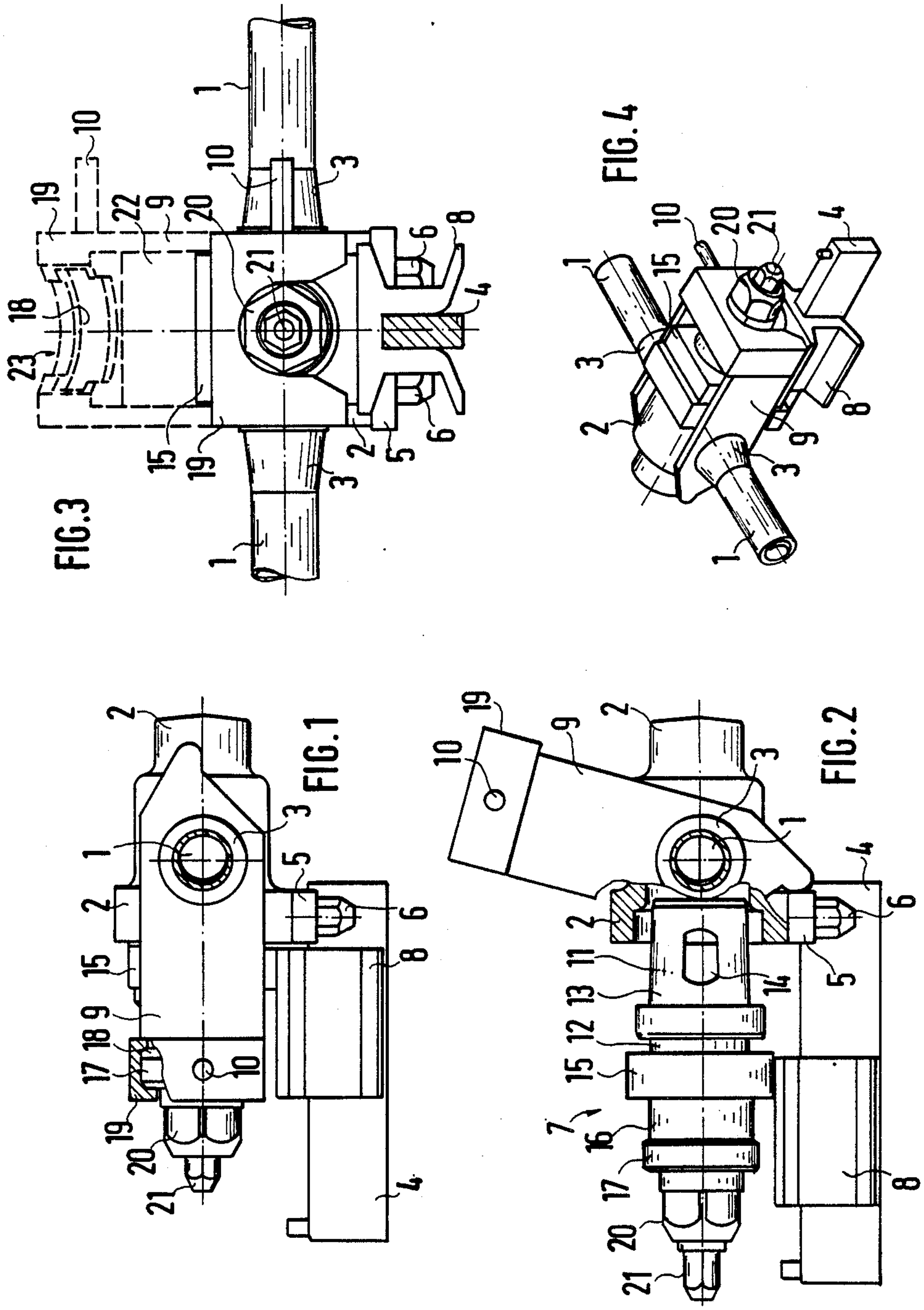
FIG. 1 is a part sectional diagrammatic presentation of the accessory according to the invention during normal operating conditions.
FIG. 2 is a side elevation of the accessory according to the invention in open condition with the valve member withdrawn from the case.
FIG. 3 is a front elevation of the accessory.
FIG. 4 is a perspective view of the closed accessory.

With reference first being made to FIGS. 1 to 4, the accessory, in the instant case a remote control valve which is serviced by remote handling is installed in a pipeline 1 and has its valve casing 2 welded to the pipeline 1 by connecting pieces 3. The valve casing 2 is held on a stationary slide rail 4 at which it is secured by screws. In the embodiment illustrated in FIGS. 1 to 4 the valve casing is connected to the stationary slide rail 4 by a transverse beam 5 and screws 6, the transverse beam 5 being welded to the slide rail 4.

The members of the valve which are subject to wear and must be exchanged, especially the valve member and the valve seat are combined in an exchange part 7 which is fixed to a slide shoe 8 guided on the slide rail 4 along which it is displaceable. A pivotable clamping bracket 9 is retained at the valve casing and its pivot axis is the common axis of the pipeline 1, while the necessary pivot bearings are housed in the connecting pieces 3. The clamping bracket 9 laterally embraces the valve casing 2 and, when in closed position, also the substantial portions of the exchange part 7. As shown in FIGS. 2 and 3, the clamping bracket may be tilted in upward direction to open it so that the exchange part 7 may be pulled out of the valve casing 2. The clamping bracket includes a manipulator handle 10 which is mounted laterally and serves for pivoting of the clamping bracket.

The exchange part 7 and the clamping bracket 9 cooperate in such manner that, on the one hand, the exchange part 7 is firmly locked together with the valve casing 2 in the closed operative position and, on the other hand, the exchange part 7 is supported on the clamping bracket 9 for being taken out. To this end the exchange part 7 has the following structure. A conical valve plug 11 (cf. FIG. 5) having a contiguous (valve) stem 12 is received in a bushing 13 which is a component of the exchange part 7. The bushing 13 is made of metal coated with plastic material. FIG. 2 shows the valve port 14 of the valve plug 11 and of the bushing 13 in mutual alignment. The valve stem 12 extends through a cover 15 formed with an internal thread. The stem 12 further extends through a bore in a central bolt 16 carrying an external thread which is threaded into the internal thread of the cover 15. The central bolt 16 has a continuous projecting collar 17 which is guided in a groove or recess 18 formed at the front free end 19 of the clamping bracket 9 when the latter is closed. There is clearance between the groove 18 and the collar 17 in axial direction of the stem 12, the groove serving as a stop in both directions. At its end facing the free end of the stem 12 the central bolt 16 has a hexagonal portion 20. The end of the stem 12 protruding out of this hexagonal portion 20 is formed as an actuating extension 21 and may carry a hexagon, a square or a screw driver slot to permit rotation of the valve member. During normal operation a remote handling means (not shown) acts on this actuating extension 21.

The cover 15 is connected firmly with the slide shoe 18, for instance by welding.

The clamping bracket 9 is formed at its top with a recess 22 so that it will not interfere with the valve casing 2 when being swung upwardly. As shown in FIG. 3, the front wall (19) of the clamping bracket 9 likewise is formed with a recess 23 which is open toward the bottom so that it may engage over the collar 17 and the hexagonal portion 20 as well as the actuating extension 21 may project out of this opening. The front wall is thickened so that the groove 18 may be formed in the same.

In the context of the instant invention the mode of operation of the accessory shown in FIGS. 1 to 4 is as follows: If the exchange part 7 is to be replaced by remote handling by means of a manipulator, the manipulator is used to turn the central bolt 16 (engaging the hexagonal portion 20) with respect to the cover 15 while the clamping bracket 9 is closed. This will first cause the collar 17 to travel in the direction of the valve casing 2 (to the right in FIG. 1) until it comes to a stop at the corresponding sidewall of the groove 18 where it will be supported. Upon further rotation of the central bolt 16 in the same direction the cover 15, the bushing 13 connected to the same, as well as the valve member (stem 12 and plug 11) are pulled out of the valve casing 2 (to the left in FIG. 1) while the slide shoe 8 is displaced at the same time. The complete exchange part 7 containing all elements subject to wear thus is pulled out of the valve casing and out of the pipeline, in terms of effect. When the distance of rotation of the thread between the cover 15 and the central bolt 16 has been taken up, the exchange part 7 definitely will have been loosened to such a degree from the valve casing 2 that it can be pulled out without any exceptionally great force. To this end the manipulator grips the clamping bracket 9 by the manipulator handle 10 and pivots the same in upward direction, as shown in FIG. 2. Then the manipulator may pull out the exchange part entirely by means of the slide shoe 8 guided along the slide rail 4.

A new exchange part 7 is then inserted in inverse order. In the starting position for insertion, the cover 15 and the central bolt 16 are fully screwed into each other so that they have the shortest possible distance from each other. The manipulator then introduces the replacement part into the valve casing along the slide rail 4. Thereupon the clamping bracket 9 is swung into closed position and the manipulator rotates the central bolt 16. This will first cause the collar 17 to travel in the direction away from the valve casing 2 (toward the left in FIG. 1) until it comes to a stop at the corresponding wall of the groove 18 where it will be supported. Upon further rotation of the bolt the cover 15, the valve member including the stem 12 and the plug 11 as well as the bushing 13 are displaced further in the direction of the valve casing 2 (to the right in FIG. 1) so that the bushing 13 is pressed firmly into the valve casing 2.

This shows that the exchange part may be replaced quickly, safely, and reliably by means of a manipulator, all individual components subject to wear being combined in the exchange part. Only one central bolt 16 and one bracket (clamping bracket 9) must be actuated for the exchange. During the exchange process the pipeline remains fixed in its operating position and thus cannot become displaced, as would be the case if the entire valve were exchanged (including the valve casing).

Reference will now be made to FIGS. 5 to 9.

Figure 5:
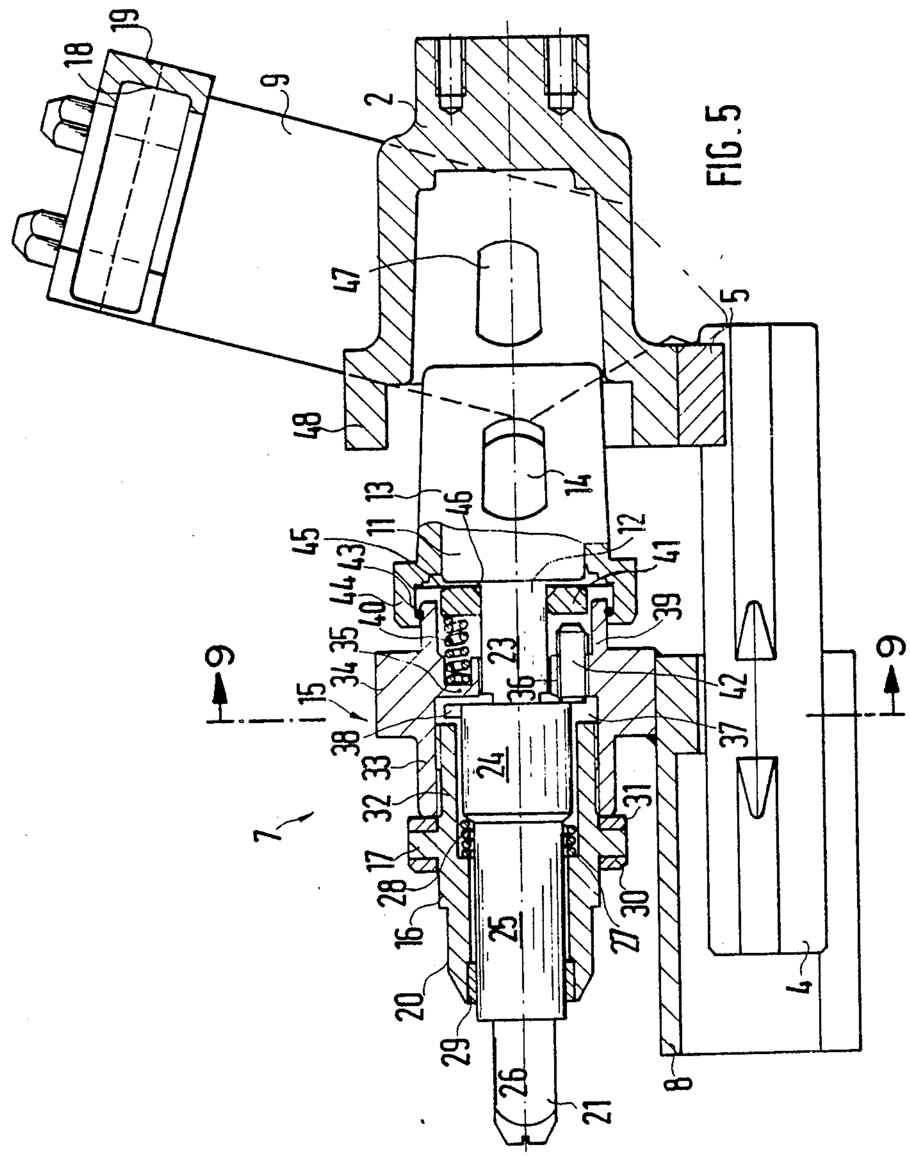
FIG. 5 is a more detailed sectional side elevation of the open accessory similar to FIG. 2.

FIG. 5 shows the exchange part 7 already separated from the valve casing 2, and the clamping bracket 9 is tilted upwardly. This corresponds to the position shown in FIG. 2.

The stem 12 of the valve member has several sections 23, 24, 25, and 26 of different diameters. Section 23 which is directly adjacent the valve plug 11 has the smallest diameter. The next section 24 has the greatest diameter. It is followed by section 25 of somewhat reduced diameter and this in turn is followed by section 26 which constitutes the actuating extension 21.

Sections 24 and 25 are substantially located within the central bolt 16 the through bore of which includes a step 27 so that a cavity is formed between this step and the step between the sections 24 and 25 to receive a compression spring 28 which rests on the step 27 and on the step formed between the sections 24 and 25.

A slide ring 29 is received in a groove at the free end of the central bolt 16 and serves as a bearing between the section 25 and the central bolt 16. The continuous radially outwardly projecting collar 17 is provided approximately in the middle of the central bolt 16 and at either side of the same there is a disc 30, 31 made of hardened steel. Section 32 of the central bolt facing from the collar 17 in the direction of the valve casing 2 carries an external thread which is threaded into an internal thread of a section 33 of the cover 15. The cover 15 has an outwardly projecting body 34 designed, for instance, as a square and connected by its bottom surface to the slide shoe 8 by welding. The sidewalls of the body 34 are covered by the sidewalls of the clamping bracket 9 when the latter is folded into closed position.

FIG. 5 shows the central bolt 16 and the cover 15 fully screwed into each other so that they have the shortest possible distance from each other.

In the area of its body 34 the cover 15 furthermore has a radially inwardly projecting portion 35 carrying a sliding bearing 36 in which section 23 of the stem 12 is supported. A cavity 37 is formed between this portion 35 and the free end of section 32 of the central bolt 16 to receive an abutment lug 38 projecting radially outwardly from section 24 of the stem 12 and cooperating with a rotational stop (not shown) of the cover 15, thus defining the rotary limit positions of the valve member (cf. FIG. 9).

The cover 15 further includes a portion 39 projecting away from the body 34 in the direction of the valve casing 2 and being spaced from the opposite section 23 of stem 12 so that a cavity is defined. This cavity houses at least one spring 40 which, on the one hand, rests on portion 35 and, on the other hand, on a disc 41. Moreover, a bolt 42 is threaded into this portion. It is positioned parallel to the axis of the valve stem and serves as a set screw for the axial alignment of the valve stem 12 and also as an adjustable limiting stop for the disc 41. As the end facing to the left of bolt 42 abuts against the edge of section 24 facing to the right of the valve stem 12, it limits the relative movement between the valve stem 12 and the central bolt 16 caused by the compression spring 28.

The bushing 13 is connected in form lock with the portion 39 of the cover 15. To this end a steel ring 43 is inserted in a groove formed in the portion 39, the bushing 13 extending by its free front portion 44 over this steel ring 43 and having a radially inwardly directed collar so that the steel ring 43 holds together the bushing 13 and the cover 15 against any tension. For assembly, bushing 13 is slipped over portion 39 of cover 15 and the steel ring 43 is introduced through a lateral opening (not shown), a procedure during which it adopts bent annular shape. The steel ring 43 does not counteract any compressive forces tending to push members 13 and 15 together. This is accomplished by the bolt 42 acting as a limiting stop as well as by the abutment between the body 34 and the portion 44. The bushing 13 is provided with a diaphragm 45 for sealing the valve plug 11, the diaphragm being positioned between the rearwardly facing edge of the valve plug 11 and the (annular) disc 41. At its inner edge facing the valve plug 11 the disc 41 is chamfered to receive another ring 46 to which the diaphragm 45 is fixed. Perfect sealing thus is accomplished also at section 23 of the stem 12 by the wedging action of the rings 46 and 41.

The spring 40 presses the ring 41 against the diaphragm and the diaphragm against the rearwardly facing edge of the valve plug 11 whereby the plug 11 is pressed into the bushing 13 and whereby the mutual positions thereof are fixed during assembly. At the same time, the relative position of the bushing 13 with respect to the cover 15 is fixed (under the influence of the steel ring 43).

The bushing 13 and the interior of the valve casing 2 are designed to be slightly conical so as to assure both easy introduction and a firm relative fit.

The alignment of the bushing 13 in the direction of rotation must be assured for inserting the exchange part 7 into the valve casing 2 in order that the valve port 14 of the bushing 13 be aligned with the corresponding port 47 formed in the valve casing 2. This may be obtained in a manner not illustrated by a groove and tongue connection or by suitable configuration of the two members, such as suitable shaping of portion 44 of the bushing 13 and of the portion 48 of the valve casing 2 which receives the same. Furthermore, twist preventing means may be provided which will be described in greater detail with reference to FIGS. 7 to 9.

Figure 6:
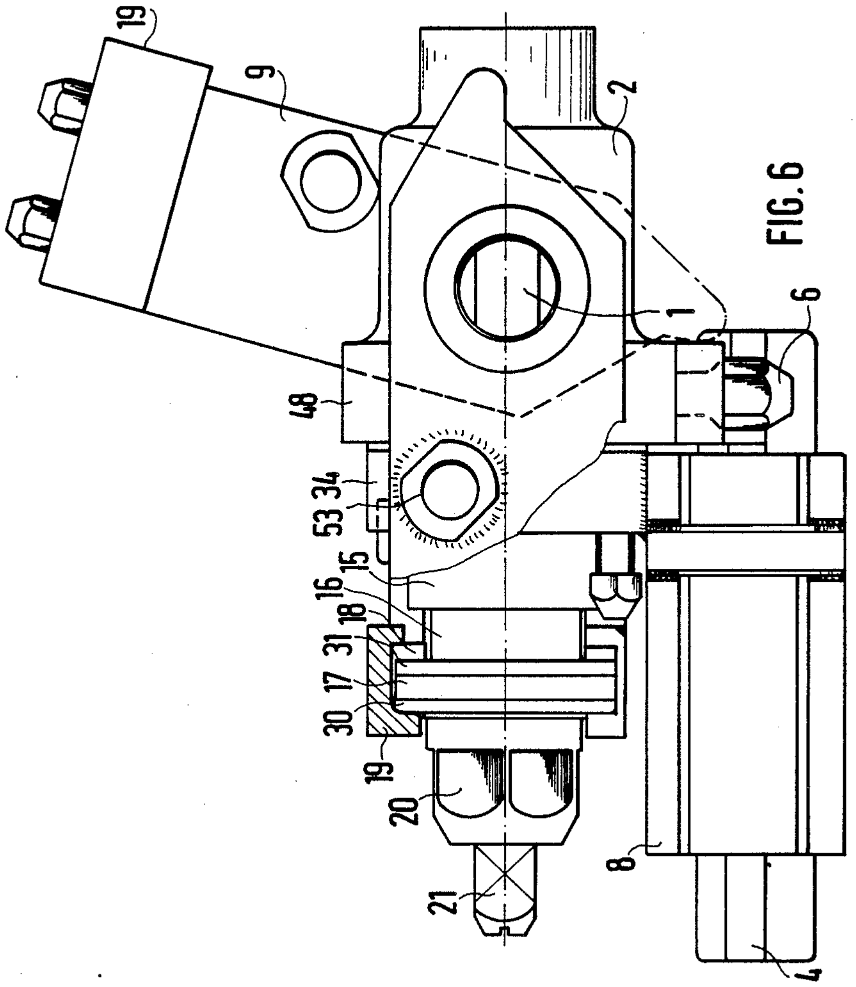
FIG. 6 is a part sectional detailed side elevation of the accessory similar to FIG. 1.

First of all, the assembly of the exchange body 7 will be described. The manipulator (not shown) displaces this part by means of the slide shoe along the guide rail 4 until the bushing will have been introduced into the valve casing. The central bolt 16 and the cover 15 are fully screwed into each other, as shown in FIG. 5. Thereupon the clamping bracket 9 is pivoted downwardly, the collar 17 and the two discs 30 and 31 coming to lie in the groove 18. If the central bolt 16 then is rotated, the axial spacing between the central bolt 16 and the cover 15 will be enlarged. As the exchange part 7 and especially the bushing 13 already have been introduced largely into the valve casing 2, the central bolt 16 thus will move away from the valve casing 2 (to the left in FIG. 5) until the ring 30 engages the front sidewall of the groove 18 where it is supported. This is shown in FIG. 6. As the central bolt 16 is rotated further, it cannot move any further in axial direction to the left in FIG. 5 so that the cover 15 is displaced in the direction of the valve casing 2 (to the right). This also causes the cover 15 to be pushed slightly into the bushing 13 until the bolt 42 comes to rest against the disc 41. Upon further rotation of the central bolt 16 and consequently further displacement of the cover 15 the bolt 42 presses against the disc 41 which in turn presses against the valve plug 11 by way of the diaphragm 45, the plug thus pressing the bushing 13 into the valve casing 2.

Following this procedure, the exchange part may be relieved somewhat by rotating the central bolt 46 slightly in the opposite direction until the collar 17 or the disc 30 is no longer pressed against the front sidewall of the groove 18. Aided by the pressure of spring 40, the bushing 13 and the cover 15 thus will move apart a little so that the bolt 42 no longer abuts against the disc 41 and the exchange part 7 consequently adopts the configuration presented in FIG. 5. Still the valve plug 11 remains loaded by spring 35 so that its axial position is maintained with respect to the bushing 13.

Disassembly is effected accordingly in inverse order. The central bolt 16 is rotated such that it will be threaded further into the cover 15. As the exchange part 7 at first remains firmly pressed into the valve casing 2, only the central bolt 16 initially moves toward the valve casing 2 until the collar 17 or the disc 31 abuts against the rear sidewall (right side in FIG. 6) of the groove 18 where it finds support. Upon further rotation of the bolt, the cover 15 is pulled away from the valve casing 2. The bolt 42 presses against the step formed between the sections 23 and 24 so that also the valve member is entrained. By means of the steel ring 43 the cover 15 further pulls the bushing 13 to the left, as seen in FIG. 5, so that the bushing is pulled out of the valve casing 2. As soon as the exchange unit 7 has been loosened from the valve casing 2, the clamping bracket 9 is pivoted in upward direction, and then the manipulator may pull out the exchange part 7 entirely along the slide rail.

Figure 7:
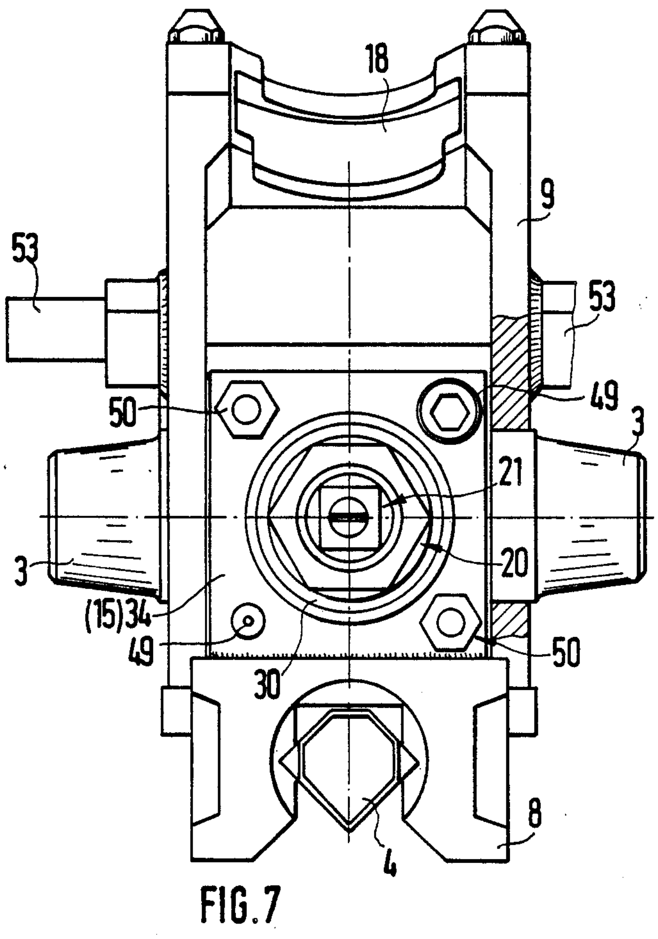
FIG. 7 is a detailed front elevation similar to FIG. 3.
Figure 8:
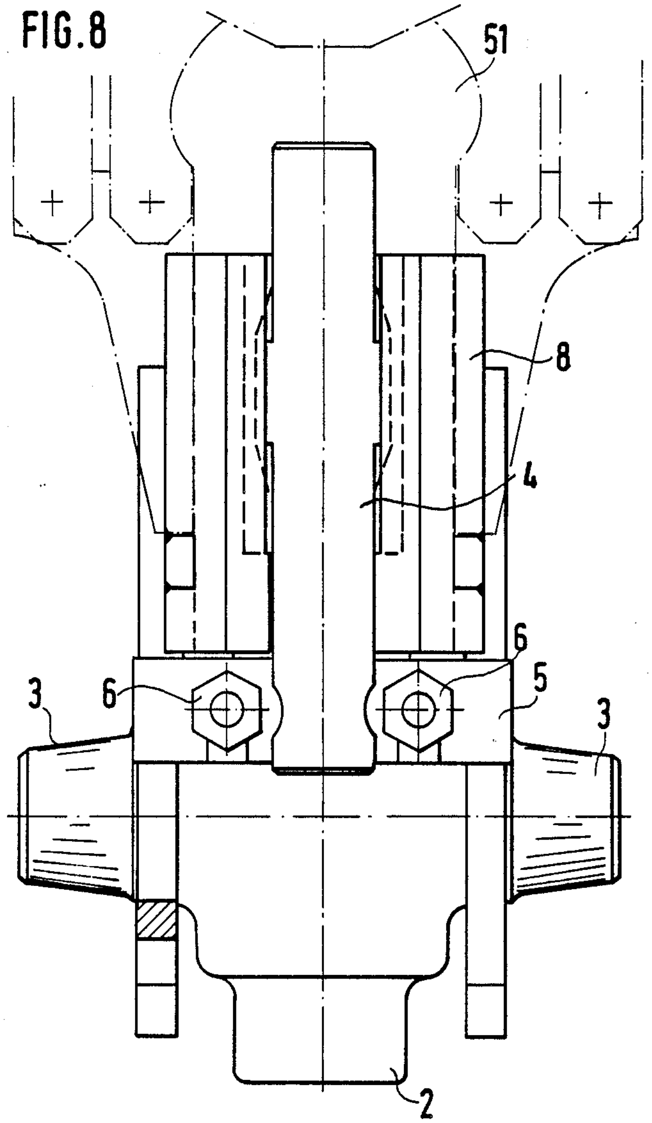
FIG. 8 is a bottom view of the accessory.
Figure 9:
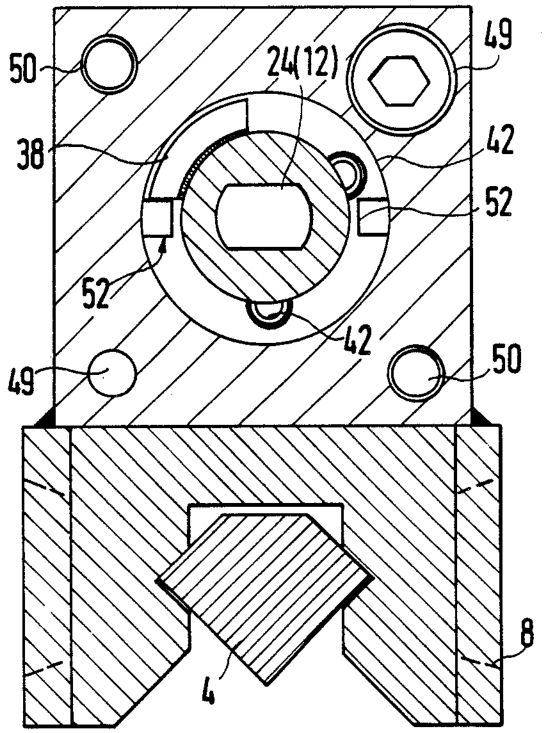
FIG. 9 is a section along line 9-9 in FIG. 5.

With reference to FIGS. 7 to 9 further details of the twist preventing means and another possibility of disassembly in cases of emergency will be illustrated. Two diagonally opposed screws 49 are threaded into the body 34 of the cover 15 to prevent rotation between the cover 15 and the bushing 13 as well as between the bushing 13 and the valve casing 2. The screws extend parallel to the axis of the stem 12 and fully through the body 34 so as to project out of the same in the direction toward the valve casing. Portion 44 of bushing 13 has recesses which correspond to these screws 49 and surround them approximately around half of their outer circumference (180°). When the screws 49 are inserted, therefore, the bushing 13 consequently cannot become twisted with respect to the cover 15. The portion 48 of the valve casing also has corresponding recesses for the free halves of the screws 49 so that these screws enter into these recesses when the exchange part 7 is introduced. In this manner the bushing 13 is locked in rotational direction also with respect to the valve casing 2. The front ends of these screws located between portions 44 and 48, of course, need not be formed with threads. It is obvious that this solution still permits mutual displacement in axial direction between the cover 15 and the bushing 13 and that the screws 49 are replaced together with the entire exchange part 7.

It is also sufficient to provide only one screw 49 while the other one (bottom left one in FIG. 7) is embodied by a pin. FIG. 7 further shows two screws 50 which likewise are positioned diagonally opposite each other at the body 34 of the cover 15 and extend parallel to the main axis of the shaft 12. These screws 50 are positioned in such manner that they are supported at the valve casing 2, for instance at the outwardly directed front edge of portion 48. If the threading between the central bolt 16 and the cover 15 should happen not to be movable, actuation of these two screws 50 still will permit the exchange part 7 to be pulled out of the valve casing 2.

FIG. 8 is a bottom view illustrating that the manipulator 51 may be displaced along the slide rail 4.

FIG. 9 finally is a sectional elevation along line A-A in FIG. 5 on an enlarged scale. This figure especially shows the provision of the abutment lug 38 at section 24 of the stem 12 as well as two counter stops 52 which are provided in the body 34 of the cover 15. Likewise to be seen is that two bolts 42 (corresponding to FIG. 5) are provided. And finally also the screws 49 and 50 are presented more clearly.

With reference to FIGS. 6 and 7 it may be seen that two cams project laterally from the clamping bracket 9. A remote handling means may be fastened to these cams for actuating the valve during normal operation by rotating the extension 21.

All technical details presented in the claims, specification, and drawings may be essential of the invention, both individually as well as in any desired combination.

What is claimed is:

1. A remote control handling accessory adapted for use with a pipeline comprising:

a hollow case not subject to wear and permanently secured to said line;

a plurality of elements which are subject to wear and must from time to time be removed and replaced, said elements being connected in operative arrangement and removably secured to the case;

a hollow clamping bracket pivotally secured to the case, said bracket having a first closed position at which it at least partially encloses said elements and a second open position at which it is swung away from and exposes said elements;

said elements extending along an axis which is aligned with the bracket when it is in its first position and including a central bolt which extends along said axis and can be moved back and forth along the axis, wherein one of the elements is a cover having a hollow thread threadedly engaged by the bolt, all elements other than the bolt and cover cooperating with the cover whereby displacement of the cover along the axis will be also displace said all other elements.

2. The accessory as set forth in claim 4 wherein the bolt has a collar concentrically disposed about the axis, the bracket having a groove in which the collar is disposed when the bracket is in its first position.

3. The accessory as set forth in claim 2, wherein a clearance in the axial direction is disposed between collar and groove.

4. The accessory as set forth in claim 2 further including first and second annular discs disposed on corresponding sides of the collar to engage corresponding side walls in the groove.

5. The accessory as set forth in claim 1 wherein said case is secured to a stationary guide rail and an element other than the bolt and cover is a slide shoe secured to the cover and movable along the rail.

6. The accessory as set forth in claim 1 wherein the elements other than the bolt and the cover include a valve member with a plug and a stem, the bolt is hollow, the stem extending through the bolt and cover, and a bushing which surrounds the plug and is insertable in the case, the case having first and second ports the bushing having two corresponding valve ports which are aligned with the case ports when the elements are disposed in operative relationship with the case.

7. The accessory as set forth in claim 6 wherein the bushing is disposed non-rotatably in the cover.

8. The accessory as set forth in claim 11 wherein the accessory can be actuated by a remote drive means, the accessory including two lateral cams secured to the bracket and adapted to be engaged by said means.

* * * * *